United States Patent [19]

Bernard

[11] 4,060,490
[45] Nov. 29, 1977

[54] COMPOSITION AND METHOD FOR ENHANCED OIL RECOVERY UTILIZING AQUEOUS POLYACRYLAMIDE SOLUTIONS

[75] Inventor: George G. Bernard, La Mirada, Calif.

[73] Assignee: Union Oil Company of California, Brea, Calif.

[21] Appl. No.: 716,887

[22] Filed: Aug. 23, 1976

[51] Int. Cl.² .......................................... E21B 43/22
[52] U.S. Cl. .......................... 252/8.55 D; 166/274; 166/275
[58] Field of Search .................... 252/8.55 D, 8.55 B; 166/274, 275

[56] References Cited

U.S. PATENT DOCUMENTS

| | | | |
|---|---|---|---|
| 2,827,964 | 3/1958 | Sandiford et al. | 252/8.55 X |
| 2,941,950 | 6/1960 | Korpi et al. | 252/153 |
| 3,002,960 | 10/1961 | Kolodny | 252/8.55 X |
| 3,330,346 | 7/1967 | Jacobs et al. | 252/8.55 X |
| 3,500,923 | 3/1970 | Reisberg | 252/8.55 X |
| 3,768,560 | 10/1973 | Hill et al. | 166/274 |
| 3,811,504 | 5/1974 | Flournoy et al. | 252/8.55 X |
| 3,890,239 | 6/1975 | Dycus et al. | 166/274 X |

*Primary Examiner*—Herbert B. Guynn
*Attorney, Agent, or Firm*—Richard C. Hartman; Dean Sandford; Gerald L. Floyd

[57] ABSTRACT

A composition and method for enhanced oil recovery utilizing an aqueous displacement fluid containing or contaminated by brine and containing a polyacrylamide or polyacrylamide derivative as a thickener and "OK Liquid" detergent.

10 Claims, 1 Drawing Figure

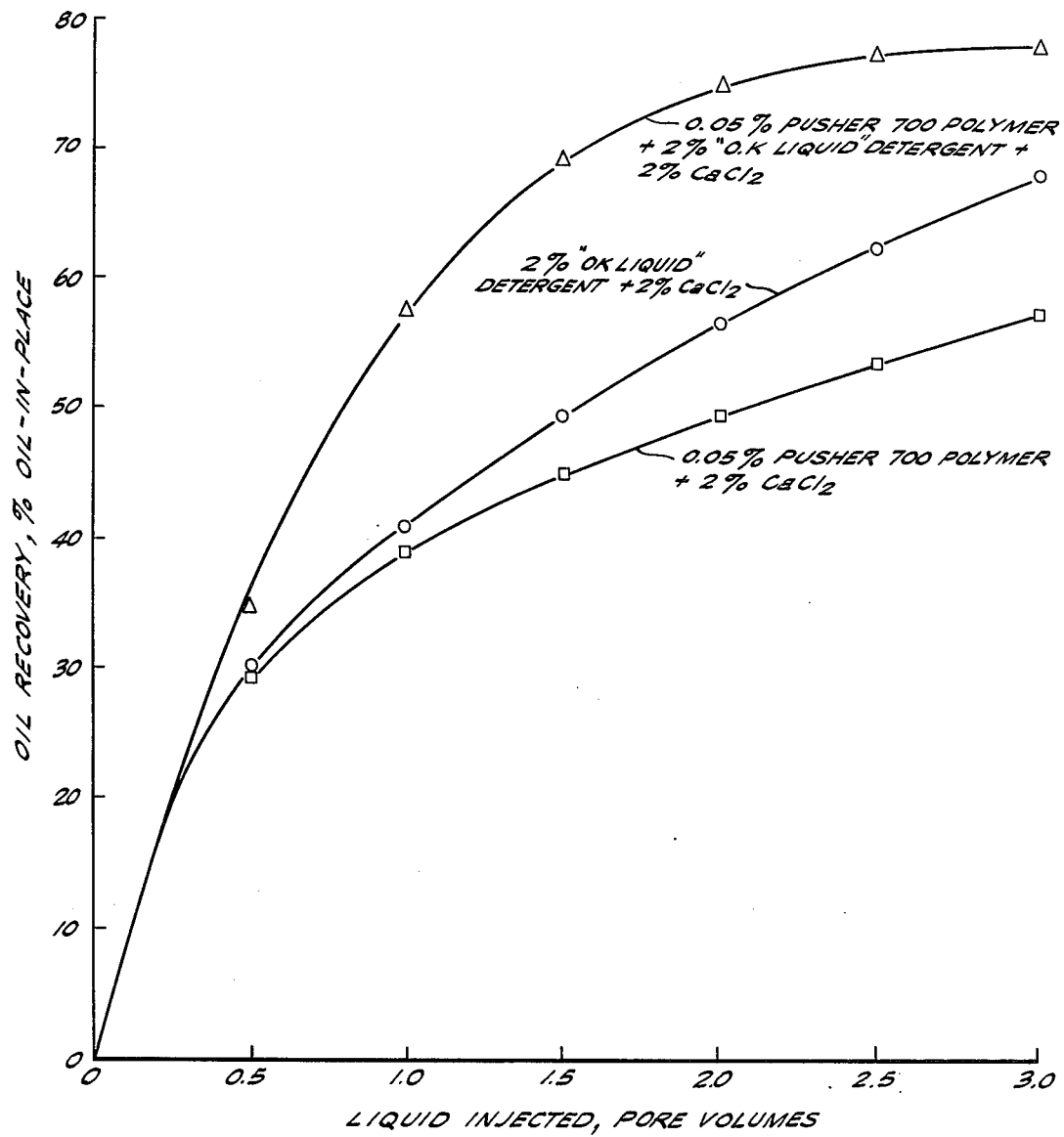

COMPOSITION AND METHOD FOR ENHANCED OIL RECOVERY UTILIZING AQUEOUS POLYACRYLAMIDE SOLUTIONS

BACKGROUND OF THE INVENTION

1. Field of the Invention

This invention relates to a composition for use in enhanced oil recovery, i.e., for recovery hydrocarbons from subterranean reservoirs, and to a method of carrying out such a process. More particularly, the invention relates to such a composition and method utilizing a polymer-thickened fluid having improved hydrocarbon-displacement properties.

2. Description of the Prior Art

In enhanced oil recovery processes, it is known to inject into a reservoir, via one or more injection wells, various displacement fluids which pass through the reservoir and assist in removing therefrom liquid hydrocarbons which are subsequently produced via one or more production wells. Oftentimes, the liquid hydrocarbons are relatively viscous compared to the displacement fluid. Thus, the injected displacement fluid has a tendency to finger through the liquid hydrocarbons in the reservoir, bypassing and leaving unrecovered a substantial quantity of the hydrocarbons. When the displacement fluid is an aqueous base fluid, it is known to add thereto a water-soluble or -dispersible polymer thickener to increase the viscosity of the displacement fluid to a value which more nearly matches the viscosity of the reservoir hydrocarbons. This thickened displacement fluid has less tendency to finger through the reservoir and is more effective in removing hydrocarbons therefrom. Particularly effective polymers of this type are the polyacrylamides of U.S. Pat. No. 3,002,960 to Kolodny and the partially hydrolyzed polyacrylamides of U.S. Pats. No. 2,827,964 to Sandiford et al., U.S. Pat. No. 3,039,529 to McKennon and U.S. Pat. No. 3,370,649 to Wolgemuth. In many instances, due to the lack of availability of fresh water or the nature of the reservoir, such as the presence therein of clays which swell in contact with fresh water and decrease reservoir permeability, or other reservoir materials which are not compatible with fresh water, it is desirable to use a natural or synthetic brine as the base displacement fluid rather than fresh water. In other instances, an injected fresh water base displacement fluid will contact and become mixed with reservoir brine as it passes through the reservoir. Many polymers, such as polyacrylamide and it derivatives, which impart a relatively high viscosity to fresh water, form solutions or suspensions having sharply lower viscosities if salts, such as those occurring in brine, are added to the system.

It is also known from the Sandiford et al. patent that optional additives, such as surface active or wetting agents, e.g., alkyl pyridinium salts, sorbitan mono-oleate, quaternary ammonium compounds and the like may be added to aqueous solutions of a water-soluble partially hydrolyzed polyacrylamide used as a displacement fluid in an oil recovery process. The surface active agents improve the contact between the aqueous flooding medium and the oil-wet particles of the reservoir.

A wide variety of surface active agents and surface active agent-containing solutions have been used in various aqueous base displacement fluids in enhanced oil recovery processes. One such material is "OK Liquid" marketed by The Procter and Gamble Company and described in U.S. Pat. No. 2,941,950 to Korpi et al. "OK Liquid" contains as one ingredient a sulfated and neutralized reaction product obtained by condensing 1 to 5 moles of ethylene oxide and 1 mole of a monohydric alcohol having from 10–16 carbon atoms in the molecule.

A somewhat similar surface active agent component is used in U.S. Pat. No. 3,500,923 to Reisberg which describes a waterflood process wherein the oil-bearing reservoir is penetrated by a slug of an aqueous solution containing a synergistic mixture of a water-soluble inorganic electrolyte such as an inorganic halide salt and a sulfated polyoxylated alcohol having from 8 to 30 carbon atoms or a salt thereof. Reservoirs conditioned by this pretreatment slug can subsequently or concurrently be subjected to a drive fluid. The drive fluid can contain the pretreatment composition plus thickeners, viscosity increasers, pushers and the like, e.g., polyacrylamides and derivatives thereof.

However, none of these prior art references deal with the problem of maintaining a high viscosity in aqueous solutions of polyacrylamide or polyacrylamide derivative which aqueous solutions contain or are contaminated by brine.

Accordingly, a principal object of this invention is to provide a composition and method for enhanced oil recovery wherein an aqueous displacement fluid containing polyacrylamide or a polyacrylamide derivative as a thickener retains a substantial degree of its viscosity in the presence of brine.

A further object of this invention is to provide such a composition and method for improving the efficiency of such a composition in the recovery of oil from a subterranean reservoir.

A still further object of this invention is to provide such a composition and method utilizing a brine-containing aqueous solution as the displacement fluid.

Another object of this invention is to provide such a composition and method useful in treating reservoirs containing brine.

Other objects, advantages and features will become apparent from the following detailed description and drawing.

SUMMARY OF THE INVENTION

Briefly, the present invention contemplates a composition and method for the enhanced recovery of liquid hydrocarbons from a subterranean reservoir wherein there is injected into the reservoir via one or more injection wells a displacement fluid comprising an aqueous solution of a polyacrylamide or polyacrylamide derivative thickener and "OK Liquid" detergent composition and liquid hydrocarbons are recovered via one or more production wells. The aqueous solution either further contains brine or contacts and becomes mixed with brine when injected into the reservoir.

BRIEF DESCRIPTION OF THE DRAWING

The drawing is a graphical representation of oil recovery as a function of the volume of displacement fluid injected in a laboratory simulation of an enhanced oil recovery process using brine thickened with partially hydrolyzed polyacrylamide, brine containing "OK Liquid" detergent, and brine containing both a partially hydrolyzed polyacrylamide thickener and "OK Liquid" detergent.

DETAILED DESCRIPTION OF THE INVENTION

According to the present invention, an improved enhanced oil recovery composition and method is proposed which employs an aqueous displacement fluid containing a polyacrylamide or a polyacrylamide derivative thickener and "OK Liquid" detergent. Further, the displacement fluid either contains brine or is injected into brine-containing reservoirs where it contacts and becomes mixed with brine.

The thickeners or viscosity-increasing agents suitable for use in the present invention include certain polyacrylamides and derivatives of polyacrylamides, especially partially hydrolyzed polyacrylamides and copolymers of acrylic acid and acrylamide. Operable polyacrylamide, partially hydrolyzed polyacrylamide and acrylic acid-acrylamide copolymers include the commercially available, water-soluble, high molecular weight polymers having molecular weights in the range of above about $0.2 \times 10^6$, preferably from $0.5 \times 10^6$ to $40 \times 10^6$ and more preferably from $3 \times 10^6$ to $10 \times 10^6$. The hydrolyzed polyacrylamides have up to about 70 percent of the carboxamide groups originally present in the polyacrylamide hydrolyzed to carboxyl groups. Preferably from about 12 to about 45 percent of the carboxamide groups are hydrolyzed to carboxyl groups. Hydrolysis of the acrylamide polymer is accomplished by reacting the same with sufficient aqueous alkali, e.g., sodium hydroxide, to hydrolyze the desired number of amide groups present in the polymer molecule. The resulting products consists of a long hydrocarbon chain, with some carbon atoms bearing either amide or carboxyl groups. Copolymerization of acrylic acid and acrylamide according to well known procedures produces acrylic acid-acrylamide copolymers. The term "hydrolyzed polyacrylamide", as employed herein, is inclusive of the modified polymers wherein the carboxyl groups are in the acid form and also of such polymers wherein the carboxyl groups are in the salt form, provided that the salts are water-soluble. Alkali metal and ammonium salts are preferred. A number of polyacrylamides and partially hydrolyzed acrylamide polymers and acrylic acid-acrylamide copolymers suitable for use in this invention are commercially available, exemplary of which are WC-500 polymer marketed by Calgon Corporation of Pittsburgh, Pa., Pusher 700 polymer marketed by The Dow Chemical Company of Midland, Michigan, and Q-41-F polymer marketed by Nalco Chemical Company of Oak Brook, Illinois.

The polyacrylamides or polyacrylamide derivatives are used in a viscosity improving amount, i.e., in an amount which increases the viscosity of the aqueous displacement fluid from about 3 to about 300 centipoises at the reservoir temperature. Generally the polymer is used in an amount of about 0.005 to about 1.5 percent by weight of the displacement fluid. Preferably, from about 0.05 to about 0.30 percent by weight polyacrylamide is used.

"OK Liquid" detergent composition is marketed by The Procter and Gamble Company, Industrial Soap and Chemical Products Division, Cincinnati, Ohio. "OK Liquid" detergent is a combination of anionic and nonionic surface active agents in suitable solvents. The composition consists of a mixture of: (a) 25–40 percent by weight of the sulfated and neutralized reaction product obtained from condensing 1–5 moles of ethylene oxide and 1 mole of monohydric alcohol of from 10–16 carbon atoms in the molecule, sulfating the resulting condensation product and neutralizing the resulting sulfated product with a neutralizing agent selected from the group consisting of ammonia and alkylol-substituted ammonia having from 2–3 carbon atoms in the alkylol group, (b) 6–12 percent by weight of an organic builder substance consisting essentially of the alkylol amide of saturated fatty acids having 10, 12 and 14 carbon atoms and an alkylol amine, said alkylol amide having not more than 3 carbon atoms in each alkylol radical; (c) 15 to 25 percent by weight of alcohol from the group consisting of ethanol, normal propanol and isopropanol; (d) not over 5 percent by weight of extraneous substances (such as sulfates and chlorides of the ammonia or substituted ammonia used, plus unsulfated alkyl ethers and other reaction products); and (e) water to make up 100 weight percent.

The concentration of "OK Liquid" detergent required depends on the nature and concentration of the salts making up the brine used to prepare the displacement fluid or those present in the reservoir. Generally about 1 to about 3 percent by weight "OK Liquid" detergent in the displacement fluid will be satisfactory with about 1.5 to about 2.5 percent by weight "OK Liquid" being preferred.

Waters or brines found in subterranean reservoirs can contain one or more of a wide variety of dissolved salts. Most commonly these salts are alkali metal and alkaline earth metal chlorides, sulfates, nitrates, carbonates and bicarbonates. Iron, alumina and silica are often present in small amounts. Occasionally brines may also contain hydrogen sulfide and sulfur dioxide. The salts most detrimental to the viscous polyacrylamide-containing aqueous solutions appear to be those containing divalent cations, e.g., calcium chloride.

In selecting a brine to use as the base displacement fluid for treating reservoirs having a sensitivity to fresh water, it is generally preferred to use natural brine produced from the reservoir. Alternatively, salts similar in kind and in amount to those found in the natural reservoir brine can be added to a natural brine from another source or to fresh water to prepare a synthetic brine. If the reservoir is not sensitive to fresh water but contains brine which contacts the mixes with any injected displacement fluid, the base displacement fluid can be fresh water, a natural brine or a synthetic brine.

The displacement fluid can be prepared at the surface of the well in which it is to be used or at any convenient location remote from the well and then transported to the well site. The ingredients can be mixed together in any desired order. Preferably, the polyacrylamide and "OK Liquid" detergent are mixed into the water or brine. Any suitable mixing chamber equipped with a stirrer can be used, e.g., a tank equipped with a paddle stirrer or a screw-type stirrer. The displacement fluid is ready for injection into the well as soon as the polyacrylamide and the "OK Liquid" are dissolved in the aqueous media.

The invention is further described by the following examples which are illustrative of specific modes of practicing the invention and are not intended as limiting the scope of the invention defined by the appended claims.

EXAMPLES 1 – 12

The effect is determined of various salt concentrations on the viscosity of aqueous displacement fluids containing Pusher 700 polymer, a polyacrylamide hydrolyzed to the extent of 15 to 45 percent marketed by The Dow Chemical Company, "OK Liquid" detergent or mixtures of these two additives. The displacement fluid components are stirred together for 1 hour with a magnetic stirrer and the viscosity determined at 6 r.p.m. and 25° C. using a Brookfield Model LVT viscometer equipped with a UL adapter. The results of these tests are shown in the following Table. The results illustrate that in either calcium chloride or sodium chloride brine the viscosity of a displacement fluid containing a mixture of Pusher 700 polymer and "OK Liquid" detergent is higher than the viscosity of a displacement fluid containing either the polymer or the detergent alone.

TABLE

EFFECT OF SALT CONCENTRATION ON VISCOSITY OF VARIOUS DISPLACEMENT FLUIDS

| Ex. | Salt | Concentration (percent by weight) | | Viscosity (cps.) |
|-----|------|-----------|-----------|--------|
|     |      | Pusher 700 Polymer | "OK Liquid" Detergent | |
| 1   | 1 calcium chloride | — | — | 1.0 |
| 2   | "    | 1 | — | 1.6 |
| 3   | "    | — | 3 | 18 |
| 4   | "    | 1 | 3 | 24 |
| 5   | 3 sodium chloride | — | — | 1.0 |
| 6   | "    | 1 | — | 5.2 |
| 7   | "    | — | 3 | 2.0 |
| 8   | "    | 1 | 3 | 7.5 |
| 9   | 5 sodium chloride | — | — | 1.03 |
| 10  | "    | 1 | — | 5.2 |
| 11  | "    | — | 3 | 17 |
| 12  | "    | 1 | 3 | 27 |

EXAMPLE 13

The recovery of oil from a laboratory model simulating a reservoir containing viscous hydrocarbons is carried out using a tubular model having a diameter of 1½ inches and a length of 11¾ inches and packed with No. 16 silica sand marketed by American Graded Sand Company of Chicago, Illinois. In a typical analysis, 4.6 weight percent of this sand passes through a 100 mesh sieve, 55.5 weight percent passes through a 140 mesh sieve and is retained on a 200 mesh sieve and 40.0 weight percent passes through a 200 mesh sieve. All sieves are U.S. Standard sieve series. This sand pack has a permeability to air of 2.5 darcies, a porosity of 35 percent and a pore volume of 134 milliliters. The model is evacuated and completely saturated with 134 milliliters 200 neutral oil having a viscosity of 77.8 centipoises. There is then forced through the model at a pressure drop of 15 pounds per square inch a displacement fluid comprising an aqueous solution containing 2 percent by weight of calcium chloride, 0.05 percent by weight of Pusher 700 polymer, 2.0 percent by weight of "OK Liquid" detergent and 97.9 percent by weight of fresh water. The amount of oil recovered after 0.5, 1.0, 1.5, 2.0, 2.5 and 3.0 pore volumes displacement fluid is forced through the model is determined. The results of this test are shown in the drawing.

EXAMPLE 14

Example 13 was repeated except that no Pusher 700 polymer is used in the displacement fluid. The results of this test are shown in the drawing.

EXAMPLE 15

Example 13 was repeated except that no "OK Liquid" detergent is used in the displacement fluid. The results of this test are shown in the drawing. A comparison of the results of Examples 13, 14 and 15 shows that significantly greater oil recovery is achieved in Example 13 using displacement fluid containing both Pusher 700 polymer and "OK Liquid" detergent than in Example 14 or 15 using either of these components alone.

Various embodiments and modifications of this invention have been described in the foregoing specification, and further modifications will be apparent to those skilled in the art. Such modifications are included within the scope of this invention as defined by the following claims.

Having now described my invention, I claim:

1. A displacement fluid composition for enhanced recovery of liquid hydrocarbons from a subterranean reservoir comprising an aqueous solution comprising:
    a. about 0.005 to about 1.5 percent by weight of a polymer thickener having a molecular weight above about $0.2 \times 10^6$ selected from the group consisting of polyacrylamide, partially hydrolyzed polyacrylamide and copolymers of acrylic acid and acrylamide;
    b. about 1 to about 10 percent by weight of a liquid detergent consisting essentially of:
        1. 25–40 percent by weight of a sulfated and neutralized reaction product obtained from (i) condensing 1–5 moles of ethylene oxide and 1 mole of monohydric alcohol of from 10–16 carbon atoms in the molecule, (ii) sulfating the condensation product of (i), (iii) neutralizing the sulfated product of (ii) with a neutralizing agent selected from the group consisting of ammonia and alkylol-substituted ammonia having from 2–3 carbon atoms in the alkylol group;
        2. an organic builder substance consisting essentially of alkylol amide of saturated fatty acids having 10, 12 and 14 carbon atoms and an alkylol amine, said alkylol amide having not more than 3 carbon atoms in each alkylol radical and the amount thereof being from 6 to 12 percent by weight of the composition;
        3. 15–25 percent by weight of alcohol selected from the group consisting of ethanol, normal propanol and isopropanol;
        4. not over 5 percent by weight of extraneous substances produced by the condensing, sulfating and neutralizing reactions of step (b) (1) above; and
        5. water to make 100 percent by weight; and
    c. aqueous media selected from the group consisting of fresh water and brine to make 100 percent by weight.

2. The composition defined in claim 1 wherein the polymer thickener has a molecular weight of $0.5 \times 10^6$ to $40 \times 10^6$.

3. The composition defined in claim 1 wherein the polymer thickener is a 12 to 45 percent hydrolyzed polyacrylamide.

4. The composition defined in claim 1 wherein the aqueous media is a brine containing alkaline earth metal cations.

5. The composition defined in claim 1 wherein the aqueous media is a brine containing alkali metal cations.

6. A method for enhanced oil recovery from liquid hydrocarbon-containing subterranean reservoirs comprising:
    A. injecting into the reservoir via one or more injection wells a displacement fluid comprising:
        a. about 0.005 to about 1.5 percent by weight of a polymer thickener having a molecular weight above about $0.2 \times 10^6$ and selected from the group consisting of polyacrylamide, partially hydrolyzed polyacrylamide and copolymers of acrylic acid and acrylamide;

b. about 1 to about 10 percent by weight of a liquid detergent consisting essentially of:
1. 25–40 percent by weight of a sulfated and neutralized reaction product obtained from (i) condensing 1–5 moles of ethylene oxide and 1 mole of monohydric alcohol of from 10–16 carbon atoms in the molecule, (ii) sulfating the condensation product of (i), (iii) neutralizing the sulfated product of (ii) with a neutralizing agent selected from the group consisting of ammonia and alkylol-substituted ammonia having from 2–3 carbon atoms in the alkylol group;
2. an organic builder substance consisting essentially of alkylol amide of saturated fatty acids having 10, 12 and 14 carbon atoms and an alkylol amine, said alkylol amide having not more than 3 carbon atoms in each alkylol radical and the amount thereof being from 6 to 12 percent by weight of the composition;
3. 15–25 percent by weight of alcohol selected from the group consisting of ethanol, normal propanol and isopropanol;
4. not over 5 percent by weight of extraneous substances produced by the condensing, sulfating and neutralizing reactions of step (A) (b) (1) above; and
5. water to make 100 percent by weight; and c. aqueous media selected from the group consisting of fresh water and brine to make 100 percent by weight, and B. recovering liquid hydrocarbons via one or more production wells.

7. The method defined in claim 6 wherein the polymer thickener has a molecular weight of $0.5 \times 10^6$ to $40 \times 10^6$.

8. The method defined in claim 6 wherein the polymer thickener is a 12 to 45 percent hydrolyzed polyacrylamide.

9. The method defined in claim 6 wherein the aqueous media is a brine containing alkaline earth metal cations.

10. The method defined in claim 6 wherein the aqueous media is a brine containing alkali metal cations.

* * * * *